(12) United States Patent
Harris (10) Patent No.: US 7,916,872 B1
(45) Date of Patent: Mar. 29, 2011

(54) INTEGRATED SHORT RANGE RDS FM TRANSMITTER

(75) Inventor: Michael R. Harris, Phoenixville, PA (US)

(73) Assignee: Lee Capital LLC, Wilmington, DE (US)

( * ) Notice: Subject to any disclaimer, the term of this patent is extended or adjusted under 35 U.S.C. 154(b) by 1103 days.

(21) Appl. No.: 10/676,620

(22) Filed: Sep. 30, 2003

Related U.S. Application Data (60) Provisional application No. 60/415,110, filed on Sep. 30, 2002.

(51) Int. Cl.
*H04H 20/47* (2008.01)

(52) U.S. Cl. .............................................. 381/2; 455/91

(58) Field of Classification Search .................. 381/1–7, 381/77, 79, 58, 59; 455/186.1, 185.1, 344, 455/414.4; 701/200; 700/94; 375/340, 345, 375/346, 295, 300, 91–93
See application file for complete search history.

(56) References Cited

U.S. PATENT DOCUMENTS

| | | | |
|---|---|---|---|
| 4,092,491 A | 5/1978 | Frazer | |
| 4,379,947 A | 4/1983 | Warner | |
| 4,712,250 A | 12/1987 | Michels et al. | |
| 4,881,273 A | 11/1989 | Koyama et al. | |
| 4,887,308 A | 12/1989 | Dutton | |
| 5,038,402 A | 8/1991 | Robbins | |
| 5,119,503 A * | 6/1992 | Mankovitz | 455/45 |
| 5,134,719 A | 7/1992 | Mankovitz | |
| 5,161,251 A | 11/1992 | Mankovitz | |
| 5,239,540 A | 8/1993 | Rovira et al. | |
| 5,319,716 A | 6/1994 | McGreevy | |
| 5,327,132 A | 7/1994 | Whitecar et al. | |
| 5,349,699 A * | 9/1994 | Erben et al. | 455/186.1 |
| 5,351,186 A * | 9/1994 | Bullock et al. | 705/1 |
| 5,408,686 A | 4/1995 | Mankovitz | |
| 5,515,372 A * | 5/1996 | Porter | 370/312 |
| 5,682,431 A * | 10/1997 | Ohnishi et al. | 381/7 |
| 5,721,783 A * | 2/1998 | Anderson | 381/328 |
| 5,802,150 A * | 9/1998 | Beck et al. | 379/93.06 |
| 5,881,365 A * | 3/1999 | Yang et al. | 455/45 |
| 5,970,390 A | 10/1999 | Koga et al. | |
| 6,025,553 A * | 2/2000 | Lee | 84/610 |
| 6,085,112 A * | 7/2000 | Kleinschmidt et al. | 455/556.1 |
| 6,285,862 B1 * | 9/2001 | Ruhl et al. | 455/186.1 |
| 6,295,362 B1 * | 9/2001 | Zhang | 381/2 |
| 6,374,177 B1 * | 4/2002 | Lee et al. | 701/200 |
| 6,377,822 B1 * | 4/2002 | Grimes | 455/566 |
| 6,470,178 B1 | 10/2002 | Cummings-Hill et al. | |
| 6,782,239 B2 * | 8/2004 | Johnson et al. | 455/42 |
| 6,836,668 B1 * | 12/2004 | Nakano | 455/466 |
| 7,062,238 B2 | 6/2006 | Glaza | |
| 7,082,203 B1 | 7/2006 | Drakoulis et al. | |
| 2002/0132612 A1 * | 9/2002 | Ishii | 455/414 |
| 2003/0158737 A1 * | 8/2003 | Csicsatka | 704/273 |
| 2006/0292980 A1 * | 12/2006 | Marcos Alba | 455/3.06 |

* cited by examiner

*Primary Examiner* — Vivian Chin
*Assistant Examiner* — Lun-See Lao
(74) *Attorney, Agent, or Firm* — Stolowitz Ford Cowger LLP

(57) ABSTRACT

A low-power, software based modulator that is used to transfer text data from an auxiliary audio device to an FM radio receiver includes a processor that receives the text data to be transmitted to the FM receiver, processes the data as an RDS signal or converts the text data to speech and then combines the processed data signal with an FM audio signal that is sent to the FM receiver. In one embodiment, the auxiliary audio device is a CD or CD-MP3 player and the software-based modulator is implemented on the control processor or DSP of the device. The FM encoder that produces the FM encoded audio signal may be a separate analog encoder or may also be implemented in the control processor of the auxiliary audio device.

22 Claims, 4 Drawing Sheets

FIG.6

INTEGRATED SHORT RANGE RDS FM TRANSMITTER

This application claims the benefit of priority from provisional application No. 60/415,110 filed Sep. 30, 2002, the contents of which are incorporated herein by reference.

FIELD OF THE INVENTION

The present invention concerns Radio Data System (RDS) transmitters embedded in consumer electronic devices and, in particular, short-range RDS transmitters used in automobiles or home environments, having RDS receivers, to transmit data for display on the RDS receiver.

BACKGROUND OF THE INVENTION

Portable audio players are among the most popular devices for reproducing music. Digital players, CD-MP3 players, in particular, are experiencing significant year-to-year-growth while portable CD players are typically among the highest volume sellers.

CD players are popular as a part of automobile sound systems. Less popular are car CD-MP3 players, possibly because of their relatively high cost. This, however, is likely to change in the future as more titles become available in MP3 format and as MP3 players become less costly. Some portable audio players come with FM transmitter attachments that allow a user listen to the music on the automobile sound system through the FM receiver. Unfortunately, important information provided on the compressed audio rack or playlist track display is not available to the driver. This information may include song titles, artist names, genre and sometimes lyrics, that are often encoded in data tracks. Currently, it is cumbersome and often impossible for the driver to see the LCD screen of the CD-MP3 player because the player may be stowed in a bag or placed loose on the front passenger seat and, thus, not easily viewable by either the driver or the passenger. Also, because the LCD screens of many MP3 players are not back-lit, it is difficult or impossible to read the display in the dark when driving at night.

Lately, digital radio has started to proliferate. In particular satellite based digital broadcasting is gaining momentum. Satellite broadcasting provides many channels of clear, high quality music that may be supplemented by text data. This information is displayed on dedicated radio receivers. In order to use the existing car FM radio systems, however, the satellite broadcasting companies offer "universal" receivers that transmit the audio to the exiting FM receivers in the car on one of the radio FM band channels. In the process, the text information is lost.

It will be beneficial if a method to avoid the loss of the text data is both in CD/MP3 players and universal satellite receivers is devised.

SUMMARY OF THE INVENTION

The present invention is embodied in a low-power, FM modulator used to transfer text data from an auxiliary audio device to a conventional FM receiver. The invention includes a processor that receives the text data to be transmitted to the FM receiver, modulates the data according to a predetermined standard and adds the modulated data to modulated audio signals that are being transmitted to the car radio.

According to one aspect of the invention, the predetermined standard is a radio data system (RDS) standard According to one aspect of the invention, the processor generates a digital signal that is converted to analog form by a digital to analog converter. The analog signal is filtered by a band-pass filter and is then applied to an analog summing circuit to generate the combined signal.

According to another aspect of the invention, the processor is the control processor of the auxiliary audio device.

According to another aspect of the invention, the auxiliary audio device is an MP3 player, a CD player, a CD-MP3 player or a universal satellite receiver.

According to yet another aspect of the invention, the processor, digital-to-analog converter, filter and summing circuit are implemented as a separate device that is configured to be attached to line and data output terminals of the auxiliary audio device.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

The present invention relates to all digital music players that may provide data in addition to the music. Although the invention is described in the context of CD-MP3 players and satellite receivers, it is also applicable to other players that may have data available in addition to music. Without limitation, these players include, for example, HDD jukeboxes, FLASH players, CD players etc. In the materials that follow, these players are referred to as auxiliary audio devices to indicate their relationship to the RDS receiver. It is contemplated, however, that any of these devices may be used as a stand-alone device in addition to being used with the RDS receiver.

According to one embodiment of the present invention a portable CD (or CD-MP3) player is equipped with a tunable RDS FM transmitter. The user chooses an FM frequency that is either not used at that location or has only a weak signal and tunes the RDS-capable automobile FM receiver to this frequency. The user then tunes the transmitter to the chosen frequency. The CD player is configured to direct its analog audio output signals to the FM modulator/transmitter where it is combined with an RDS signal containing data relevant to the content of the audio output signal. The FM receiver receives the transmitted FM signal and the user can listen to the music using a superior audio system (e.g. a car audio system or home stereo system) while still being able to receive the data relevant to the music.

In one exemplary embodiment, the artist name, the song title and album (if available) are transmitted and displayed on the FM radio screen. In this embodiment, each of these items is displayed for a few seconds at a time. In another exemplary embodiment, the user is provided with controls that allow the different items of information to be scrolled across the display of the RDS-capable FM receiver.

Manual scrolling can be achieved through the use of a remote control (preferably wireless) as is described in a prior provisional application (No. 60/403,554). According to the described invention, the CD player is equipped with a wireless remote control receiver and transmitter (preferably RF). The exemplary transmitter may be conveniently attached to the steering wheel of the automobile. It allows the driver to control basic functions on the CD. For example, using this remote control the user can skip to the next song, increase/decrease volume or switch the CD player off. It also allows the user quickly scroll through titles and playlists (displayed on the FM radio screen) to choose the next selection by transmitting commands to the CD player that would be used by the stand-alone CD player to perform the same functions.

According to yet another exemplary embodiment of the invention, the text information can be annunciated prior to the start of the song (or any time the driver/user chooses to by pressing one of the buttons on the remote control). This embodiment of the invention may be used with a conventional FM receiver, that is to say, one without RDS capability. In this embodiment, audio annunciation files are created when the CD or CD-MP3 is created and are stored in short compressed audio files that are tagged and placed in front of the music files (or appended to the end of the file). In this embodiment, the files may be compressed in the MP3 or WMA format (or other formats). In another embodiment of the invention the CD or CD-MP3 processor includes software that implements a text-to-speech process (annunciation process) and the resulting speech data is transmitted to the FM receiver as a conventional FM signal. It is contemplated that sets of the resulting speech data (e.g. all titles on the CD) may be concatenated and provided as a single unit allowing a user to select a music file corresponding to an item of the set by pressing a selection key on the remote control while the item is being annunciated.

Different codes within the RDS format can be used. In one exemplary embodiment the provided information is coded as radio text messages. The RDS standard does not require any specific group types to exist thus minimizing required bandwidth for the transmission.

The subject invention may also be used with satellite radio receivers. As was described above, "universal" satellite receivers are used in conjunction with FM transmitters to "bridge" between the satellite receivers and the already installed FM stereo receivers in the cars. Because the transmitters currently in use do not include RDS functionality, all text information contained in the signal received from the satellite is lost. The solution to this problem is similar to the one described above except that the source of information is not the CD but the text information received by the satellite receiver. A universal satellite receiver according to the present invention extracts the data received with the satellite signal, formats it and modulates it as an RDS signal and then adds the modulated RDS signal to the FM signal.

In one embodiment of the present invention a wireless remote control, including a wireless receiver, coupled to the universal satellite receiver, and a wireless transmitter is added to the satellite receiver. The remote control allows the user to choose the type of information to display and allows control of basic functions on the satellite receiver in the same manner described above with reference to the CD player. In an exemplary embodiment the wireless remote control is RF based (for example using the frequency range of garage door openers). In another embodiment the remote control is IR (infrared) based.

RDS Transmitter Implementations

In an exemplary embodiment of the present invention, the RDS modulation is implemented in software running on the processor (either a microprocessor, digital signal processor (DSP) or field-programmable gate array (FPGA) of the CD or CD-MP3 player. Auxiliary audio devices of the type described above commonly include processors that are sufficiently powerful to be used as RDS modulators. These types of devices typically employ either an advanced DSP or a reduced instruction set computer (RISC/ARM or equivalent) processor. One of ordinary skill in the art would understand how each of the processes shown in FIG. 1A may be implemented on one of these processors and how the processes may be coupled to produce digital signals equivalent to the waveform shown as item 5 of FIG. 1B. The use of the processor in the auxiliary audio device also helps the "system integration" process, as the text data to be transmitted typically resides within the processor (or in memory accessible to the processor).

Figures 1A, 1B:
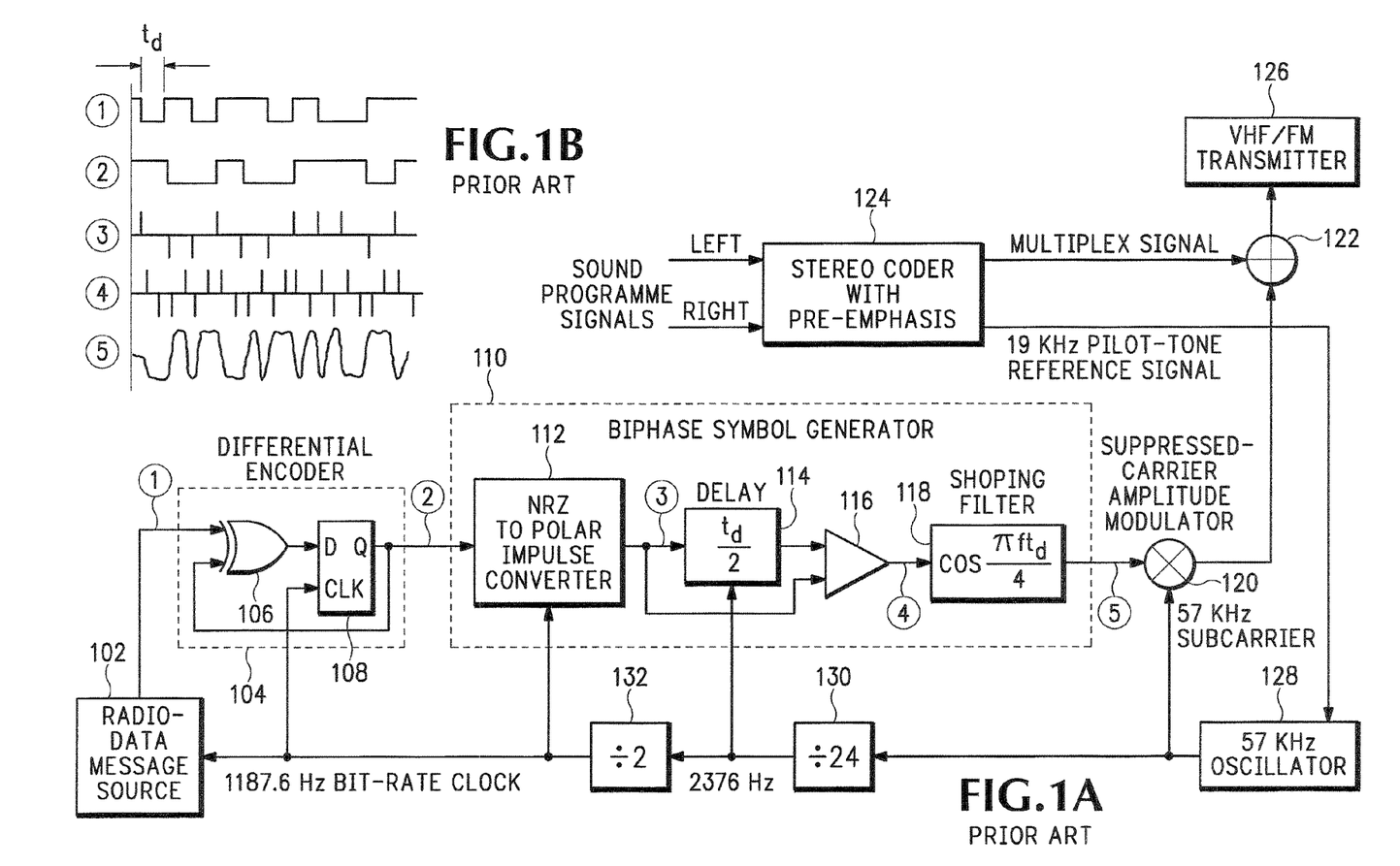
FIG. 1A (prior art) is a block diagram of an RDS transmitter.
FIG. 1B (prior art) is a timing diagram that is useful for describing the operation of the RDS transmitter shown in FIG. 1A.

A block diagram of a conventional RDS transmitter is shown in FIG. 1A. This exemplary RDS transmitter receives text data from a radio data message source 102. Data from the source is applied to a differential encoder 104 that includes an Exclusive Or gate 106 and a D-type flip-flop 108. A waveform of the input data to the differential encoder is shown as item 1 in FIG. 1B while the waveform of the output signal produced by the encoder 104 is shown as item 2. The output signal of the differential encoder 104 is applied to a biphase symbol generator 110. A non-return to zero (NRZ) to polar impulse converter 112 of the symbol generator 110 receives the differentially encoded data from the encoder 104 and converts it into an impulse signal, as shown in item 3 of FIG. 1B. The impulse signal provided by the converter 112 is applied directly to the non-inverting input terminal of an operational amplifier 116 and, through a delay 114 of $t_d/2$ seconds (where $t_d$ is the bit-time (i.e. 842 microseconds), of the original message signal) to the inverting input terminal of the amplifier 116. The amplifier 116 operates as a subtracter, which operates with the delay element 114 to convert a signal having the waveform shown in item 3 of FIG. 1B into a signal having the waveform shown in item 4 of FIG. 1B. This signal is applied to a raised cosine shaping filter 118 having a transfer function of $\cos(\pi f t_d/4)$, where f is the frequency of the input signal. The output signal of the shaping filter 118 is the output signal of the symbol generator 110 and is shown as item 5 in FIG. 1B. This output signal is heterodyned with a 57 KHz subcarrier signal in a mixer 120. The mixer also includes a notch filter to remove the 57 KHz carrier signal and a high-pass filter (not shown) that removes the fundamental components and difference components of the two signals that are combined to form the heterodyned signal, providing only the sum component (i.e. the modulated RDS signal) to an adder 122. The adder 122 adds the modulated RDS signal to the audio signal produced by a conventional stereo coder 124 and provides the combined signal to an FM transmitter 126. In this exemplary transmitter, the 57 KHz subcarrier signal is derived from a 19 KHz pilot signal provided by the stereo coder 124 by a 57 KHz oscillator 128. The 57 KHz signal is divided in frequency by 24 in frequency divider 130 to obtain a 2375 KHz signal, having a period of $t_d/2$, which is applied to the delay element 114. the 2375 KHz signal is also applied to a frequency divider 132 which produces a signal having a period of $t_d$ which is applied to the differential encoder 104 and to the data message source 102.

Figure 2:
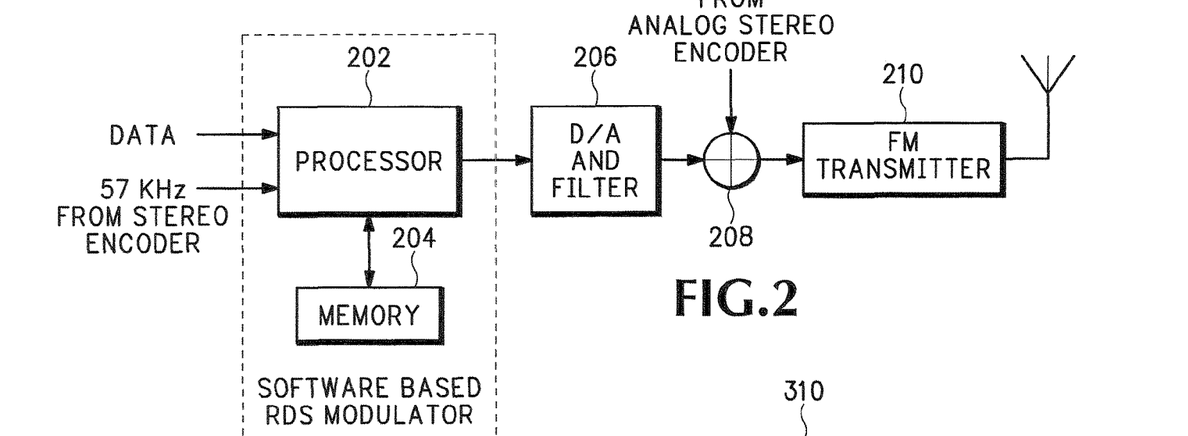
FIG. 2 is a block diagram of an RDS transmitter according to the subject invention.

FIG. 2 is a block diagram of an RDS transmitter according to an exemplary embodiment of the invention, in which the RDS modulator is implemented in software. In this exemplary embodiment, the RDS modulator is implemented on the processor 202 of the auxiliary audio device (e.g. the CD or CD-MP3 player). The processor 202 is coupled to receive the digital data signal and a 57 KHz oscillatory signal which may, for example, be provided by a stereo encoder such as the encoder 124 and oscillator 128, as shown in FIG. 1. The processor 202 may include an analog to digital converter (not shown) that digitizes the 57 KHz subcarrier signal for use by the software-based RDS modulator. Although the invention is described in terms of a processor that implements the modulator in software, it is contemplated that a processor having only hardware components (e.g. an application-specific integrated circuit (ASIC)) may also be used.

The processor 202 is coupled to a memory 204 which holds the software that controls the processor to implement the functions of the RDS modulator, as described above with reference to FIGS. 1A and 1B. In addition, the processor 202 includes a clock signal generator (not shown) that generates a processor clock signal having a frequency much greater than 57 KHz (e.g. 50 MHz). This allows the processor 202 to process each sample of the data signal according to the RDS modulation algorithm described above, to produce a digital signal representing the modulated RDS signal. This digital signal is applied to a digital-to-analog (D/A) converter and bandpass filter 206. The D/A and filter 206 convert the digital modulated RDS signal into an analog signal and filter it in a frequency band surrounding 57 KHz. In the exemplary embodiment of the invention, the digital signal produced by the processor 202 is a digital suppressed carrier signal. Consequently, the D/A and filter 206 does not include a notch filter to suppress the 57 KHz subcarrier signal. If, however, the processor 202 provides a digital modulated carrier signal, such a notch filter (not shown) may be added to the D/A and filter 206.

The output signal from the D/A and filter 206 is equivalent to the signal provided by the mixer 120, described above with reference to FIG. 1A. This signal is applied to a summing circuit 208 where it is combined with a coded stereo signal, for example, from stereo coder 124 and applied to an FM transmitter 210 for transmission to a local RDS capable FM receiver.

Figure 5A:
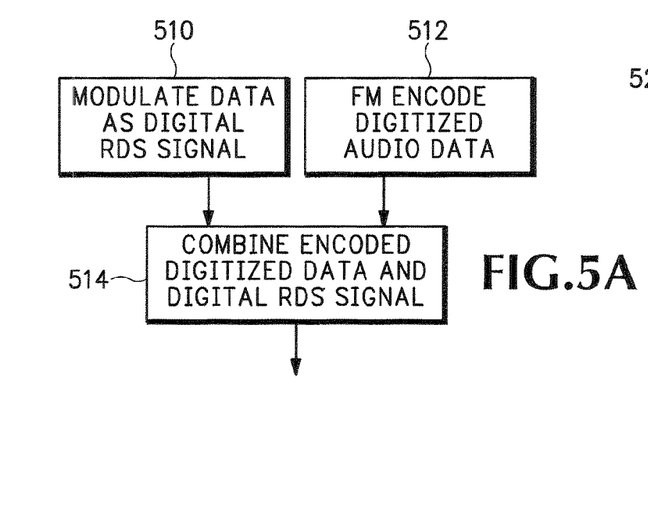
FIGS. 5A and 5B are flow-chart diagrams that are useful for describing the operation of the embodiments of the invention shown in FIGS. 3 and 4, respectively.

In yet another embodiment of the invention, both the FM audio stereo encoder and the RDS modulator are implemented in software on the RISC processor or DSP of the CD or CD-MP3 player. In the case of digital music players such as the CD-MP3 player and the satellite receiver, the pulse code modulated (PCM) audio data is readily available. Thus it becomes possible to simplify the merging of the FM stereo signal with the RDS signal. The resultant signal is then applied to a D/A converter process before modulating a low-cost FM transmitter. FIG. 5A is a flow-chart diagram that is useful for describing the operation of this embodiment of the invention. As shown in this exemplary embodiment of the invention, the modulation of the digital data as an RDS signal at step 510, is performed in parallel with the FM encoding of the digital audio data. At step 514, these two signals are combined by a simple additive process to produce the output signal of the software based stereo coder and RDS modulator.

Figure 3:
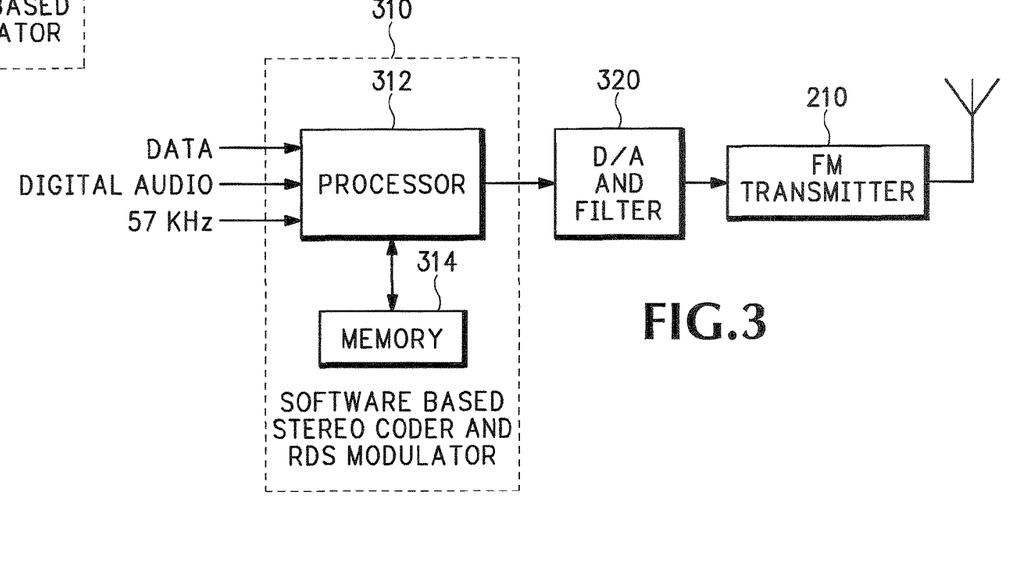
FIG. 3 is block diagram of an RDS transmitter according to the subject invention in which the stereo coder is implemented in software.

FIG. 3 shows an exemplary implementation of this embodiment of the invention. In this implementation, the digital data, a PCM digital audio signal and a 57 KHz oscillatory signal generated, for example, by a crystal controlled oscillator (not shown), are applied to the processor 312. With the memory 314, the processor 312 forms the software based stereo coder and RDS modulator 310. The processor 312 implements the functions of the FM stereo encoder as well as the functions of the RDS modulator. An exemplary FM stereo encoder that may be implemented in a DSP or RISC environment is disclosed in U.S. Pat. No. 5,682,431 entitled FM STEREO BROADCASTING APPARATUS AND METHOD which is incorporated herein by reference for its teaching on FM stereo coding and modulation. The output signal of the stereo coder and RDS modulator 310 is applied to the D/A converter and filter 320. The D/A and filter 320 band-pass filters the analog output signal of the stereo coder and modulator 310 to remove artifacts related to the sampling frequency to generate an output signal corresponding to a baseband FM stereo signal with RDS data.

Figure 4:
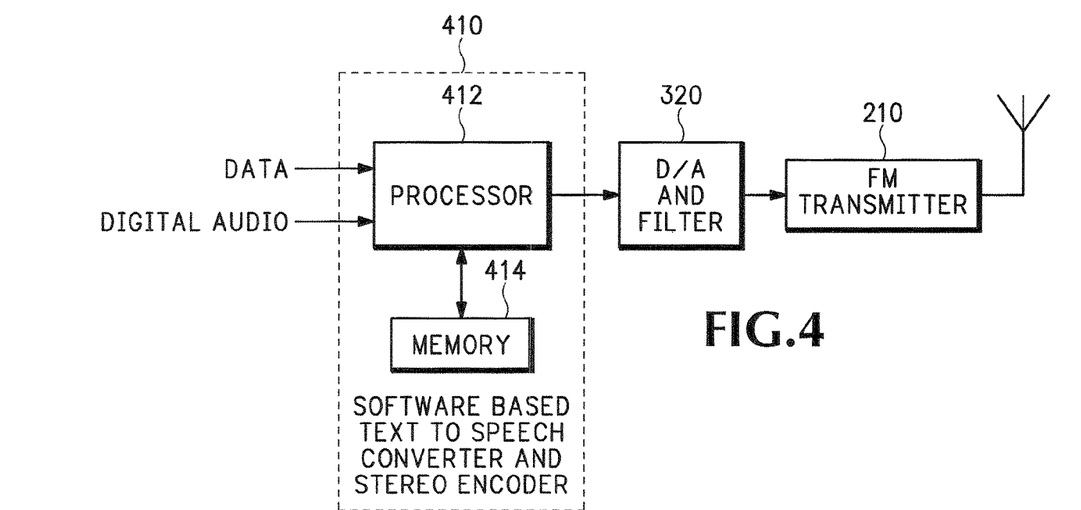
FIG. 4 is a block diagram of a transmitter according to the subject invention including a text-to-speech converter implemented in software.

As described above, one embodiment of the present invention does not need an RDS modulator. In this embodiment, the digital data is either a previously prepared digital audio file in which the data is annunciated or it is converted to speech by an annunciation process implemented in the RISC processor or DSP of the CD or CD-DVD player. This exemplary embodiment is shown in FIG. 4. In this embodiment, the digital data signal and the digital audio signal are applied to a processor 412, that, with the memory 414, forms a software based text to speech converter and stereo encoder 410. The output signal of the converter and encoder 410 is applied to the D/A and filter 320, described above, which provides a baseband FM signal to the FM transmitter 210.

Figure 5B:
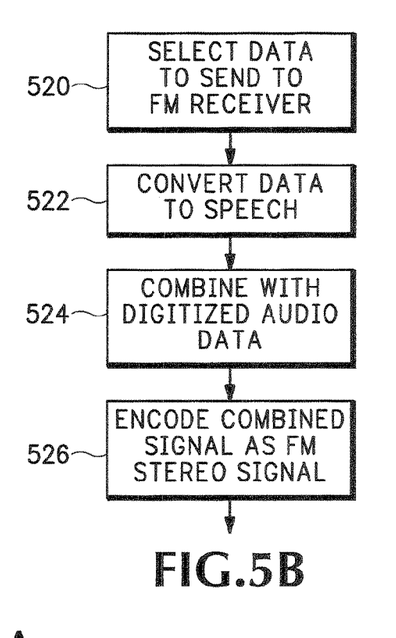

FIG. 5B is a flow-chart diagram that is useful for describing the operation of the system shown in FIG. 4. At step 520, the process selects the data to send to the FM receiver. As described above, the CD or CD-MP3 player may have access to the titles, artists, lyrics or other text data concerning the music tracks. In this step, a user selects what type of data is to be sent (e.g. just the titles) and how the data is to be sent (e.g. as an audio table of contents in a selection mode or immediately prior to or after each music track is played). At step 522, an annunciation process converts the selected data to speech. At step 524, the annunciated data is combined with the PCM digital audio data as selected by the user in step 520 and the combined signal is encoded as an FM stereo signal at step 526, using an FM stereo encoding process, as described, for example, in the above referenced patent. The output signal provided by step 526 is a digital base-band FM radio signal that may be applied to the D/A and filter 320 and transmitter 210, as described above.

Although the system described in FIGS. 4 and 5B employs a software-based FM stereo encoder, it is contemplated that it may be practiced with an analog FM encoder with minor modifications to the system shown in FIG. 2.

Device Layout

Figure 6:
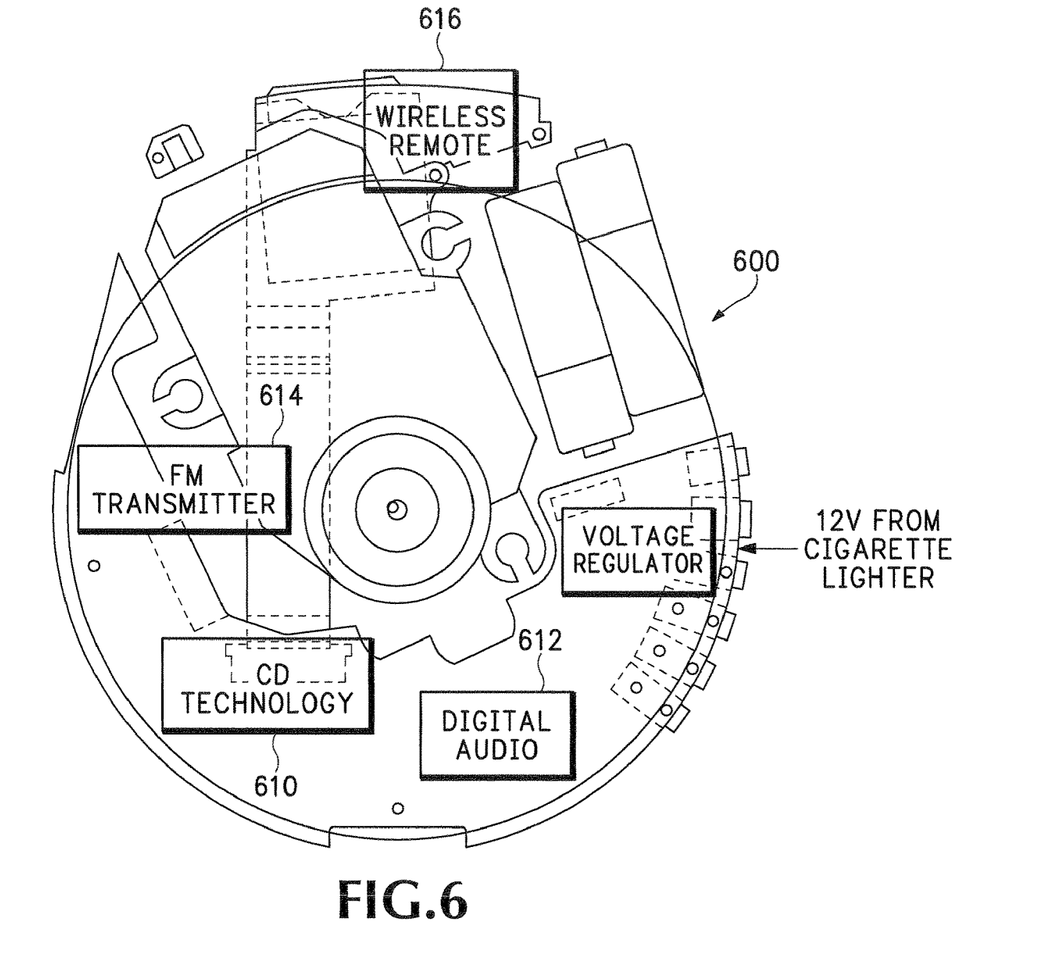
FIG. 6 is a layout diagram of a CD player that is useful for describing a possible implementation of the subject invention.

FIG. 6 is a plan drawing of an exemplary CD or CD-MP3 player 600 that shows a possible physical layout of apparatus according to the present invention. As described above, the processor used by the player is included in the CD technology block 610. The exemplary layout also includes a digital audio processor 612 that processes the PCM audio signals provided by the CD technology 610 to produce analog audio signals, when the player 600 is used as a stand-alone device. The exemplary player also includes an FM transmitter 614 and a wireless remote control receiver 616, as described above.

Several exemplary methods and apparatus have been described that allows portable players to present text data on RDS or other digital radio receivers. In addition, apparatus and methods have been described that allow "universal" satellite audio receivers (such as distributed by XM™ or Sirius™) to transmit text data from the satellite receiver to a car radio receiver for display.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An FM transmitter, comprising:
   a processor configured to identify text data providing ancillary information descriptive of digital audio signal responsive to receiving a data type, to convert the selected text data into digitally encoded speech, and to encode the digital audio signal and the digitally encoded speech according to an FM standard into an FM digital signal responsive to receiving a transmission mode;
   a converter configured to convert the FM digital signal into an analog FM signal; and
   a transmitter configured to transmit the analog FM signal;
   wherein the data type is configured to identify a type of ancillary information that is descriptive of the digital audio signal;
   wherein the transmission mode is configured to identify a mode in which to encode the digital audio signal and the digitally encoded speech such that the digitally encoded speech is annunciated after decoding responsive to the transmission mode; and
   wherein the processor includes a signal combiner configured to time-division multiplex the digital audio signal and the digitally encoded speech to generate the FM digital signal responsive to the transmission mode.

2. The FM transmitter of claim 1, further comprising a band-pass filter configured to filter the analog FM signal to exclude signal components outside of a range of frequencies according to an RDS standard.

3. The FM transmitter of claim 1, wherein the processor includes a signal combiner configured to time-division multiplex the digitally encoded speech and the digital audio signal to generate the FM digital signal responsive to the transmission mode.

4. The FM transmitter of claim 3, wherein the processor includes code to control the processor to convert the selected text data into the digitally encoded speech.

5. The FM transmitter of claim 1, wherein:
   an auxiliary audio device is configured to generate the digital audio signal; and
   the processor is a control processor of the auxiliary audio device.

6. The FM transmitter of claim 5, wherein the auxiliary audio device includes a device selected from a group consisting of a CD player, a CD-MP3 player, a universal satellite receiver, and a digital audio broadcast receiver.

7. The FM transmitter of claim 6, further comprising a wireless remote control receiver coupled to the auxiliary audio device, wherein the wireless remote control receiver is configured to receive commands to control the auxiliary audio device and to receive commands to select text data to be transmitted in the FM signal.

8. The FM transmitter of claim 1, further comprising:
   a housing physically distinct from the auxiliary audio device and to which the processor, the converter, and the transmitter are mounted, wherein the housing includes:
      an audio input configured to receive the digital audio signal from an auxiliary audio device; and
      a data input configured to receive the text data from the auxiliary audio device.

9. The FM transmitter of claim 1, wherein the data type includes titles.

10. The FM transmitter of claim 1,
    wherein the audio signal includes music tracks; and
    wherein the transmission mode includes a table of contents mode configured to indicate encoding the selected text data as an audio table of contents preceding the audio signal, before mode configured to indicate encoding at least a portion of the selected text data before each track of the audio signal to which the at least the portion of the selected text data is associated, or after mode configured to indicate encoding the at least the portion of the selected text data after each track of the audio signal to which the at least the portion of the selected text data is associated.

11. A transceiver, comprising:
    a radio data system (RDS) modulator configured to generate a modulated text data signal modulated as digital RDS signal using a digitized 57 kHz subcarrier in response to receiving text data configured to provide ancillary information descriptive of an audio signal and in response to receiving a data type;
    a frequency modulation (FM) encoder configured to generate an FM encoded audio signal in response to the audio signal;
    a signal combiner configured to time-division multiplex the modulated text data signal and the FM encoded audio signal into a combined digital signal in response to a transmission mode; and
    an FM transmitter configured to transmit the combined digital signal after conversion to a combined analog signal;
    wherein the data type is configured to identify a type of ancillary information that is descriptive of the audio signal; and
    wherein the transmission mode is configured to identify a mode in which to combine the audio signal and the modulated text data signal.

12. The transceiver of claim 11, further comprising a satellite audio receiver, wherein at least one of the RDS modulator, the FM encoder, or the signal combiner are implemented in the satellite audio receiver.

13. The transceiver of claim 11, further comprising:
    a converter configured to convert the combined digital signal to the combined analog signal.

14. The transceiver of claim 11, wherein the FM encoder is configured to generate an FM encoded digitized audio signal and further including a converter configured to convert the combined digital RDS signal and the FM encoded digitized audio signal into a combined FM analog audio signal.

15. The transceiver of claim 12, further comprising a housing configured to mount an audio receiver and at least one of the RDS modulator, the FM encoder, the signal combiner, or the FM transmitter.

16. The transceiver of claim 12, wherein the FM transmitter is tunable for retransmission of the broadcast transmission received by the satellite audio receiver to an available channel of an RDS-capable preinstalled FM stereo car receiver.

17. The transceiver of claim 11, wherein the RDS modulator is configured to receive an external audio transmission from a consumer electronic device providing the audio signal in analog audio format.

18. The transceiver of claim 11, wherein the RDS modulator is configured to receive an external audio transmission from a universal satellite receiver providing the audio signal in stereo audio format.

19. The transceiver of claim 11, wherein the FM transmitter is configured for low-power, short-range broadcast.

20. The transceiver of claim 11, further comprising a user control enabling different items from the text data to be selected for transmission to vary the display of an external RDS-capable receiver.

21. A handheld audio player, comprising:
a storage device;
a processor configured to receive an audio signal, to select text data providing ancillary information descriptive of the audio signal from the storage device responsive to receiving a data type indication, to generate from the selected text data a modulated text data signal including speech encoding of the text data, to combine the modulated text data and the audio signal into a combined audio signal responsive to a transmission mode indication, and to convert the combined audio signal into an FM signal; and a frequency modulation (FM) transmitter configured to transmit the FM signal;
wherein the data type is configured to identify a type of ancillary information that is descriptive of the audio signal;
wherein the transmission mode is configured to identify a mode in which to combine the modulated text data and the audio signal such that the speech encoding of the text data is annunciated after decoding the FM signal responsive to the transmission mode indication;
wherein the processor is configured to convert the text data into digitally encoded speech and to time-division multiplex the digitally encoded speech and the audio signal to generate a combined digital audio signal responsive to the transmission mode indication;
wherein a converter is configured to convert the combined digital audio signal into a combined analog audio signal; and
wherein the FM transmitter is configured to transmit the combined analog audio signal.

22. The handheld audio player of claim 21, wherein the handheld audio player includes at least one of a compact disc (CD) player, a flash player, an MP3 player, or a hard disk drive (HDD) jukebox.

\* \* \* \* \*

UNITED STATES PATENT AND TRADEMARK OFFICE
CERTIFICATE OF CORRECTION

| | | |
|---|---|---|
| PATENT NO. | : 7,916,872 B1 | Page 1 of 1 |
| APPLICATION NO. | : 10/676620 | |
| DATED | : March 29, 2011 | |
| INVENTOR(S) | : Harris | |

It is certified that error appears in the above-identified patent and that said Letters Patent is hereby corrected as shown below:

Column 1, line 3, below "Title" insert -- CROSS-REFERENCE TO RELATED APPLICATION --.

Column 7, line 23, in Claim 1, delete "digital" and insert -- a digital --.

Signed and Sealed this
Second Day of August, 2011

David J. Kappos
*Director of the United States Patent and Trademark Office*